United States Patent
Yang et al.

(10) Patent No.: US 6,815,358 B2
(45) Date of Patent: Nov. 9, 2004

(54) ELECTRON BEAM LITHOGRAPHY METHOD FOR PLATING SUB-100 NM TRENCHES

(75) Inventors: Xiaomin Yang, Pittsburgh, PA (US); Andrew Robert Eckert, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 246 days.

(21) Appl. No.: 10/108,309

(22) Filed: Mar. 28, 2002

(65) Prior Publication Data

US 2003/0045110 A1 Mar. 6, 2003

Related U.S. Application Data (60) Provisional application No. 60/317,699, filed on Sep. 6, 2001.

(51) Int. Cl.[7] .............................................. H01L 21/311
(52) U.S. Cl. ....................... 438/700; 438/224; 438/229; 438/231; 438/301; 438/305
(58) Field of Search ................................ 438/700, 224, 438/229, 231, 301, 305; 430/313, 314, 312, 316, 317, 323, 324, 166, 512

(56) References Cited

U.S. PATENT DOCUMENTS

| | | |
|---|---|---|
| 4,933,743 A | 6/1990 | Thomas et al. |
| 5,185,294 A | 2/1993 | Lam et al. |
| 5,360,698 A | 11/1994 | Hanrahan |
| 5,604,073 A | 2/1997 | Krounbi et al. |
| 5,670,404 A | 9/1997 | Dai |
| 5,786,253 A | 7/1998 | Hsu |
| 5,798,559 A | 8/1998 | Bothra et al. |
| 5,802,700 A | 9/1998 | Chen et al. |
| 5,828,121 A | 10/1998 | Lur et al. |
| 5,972,570 A * | 10/1999 | Bruce et al. ................. 430/314 |
| 6,218,056 B1 | 4/2001 | Pinarbasi et al. |
| 6,303,260 B1 * | 10/2001 | Hurditch et al. ............ 430/166 |
| 6,316,360 B1 | 11/2001 | Burton et al. |

FOREIGN PATENT DOCUMENTS

| | | |
|---|---|---|
| DE | 3635 462 A1 | 4/1987 |
| EP | 0 543 158 A2 | 5/1993 |
| EP | 0 651 433 B1 | 7/2000 |

* cited by examiner

*Primary Examiner*—David Nelms
*Assistant Examiner*—Renee R. Berry
(74) *Attorney, Agent, or Firm*—Buchanan Ingersoll PC (57) ABSTRACT

A lithography method for plating sub-100 nm narrow trenches, including providing a thin undercoat dissolution layer intermediate a seed layer and a resist layer, wherein the undercoat dissolution layer is relatively completely cleared off the seed layer by the developer solution such that the sides of the narrow trench will be generally vertical, particularly at the base of the narrow trench, thus facilitating plating the narrow trench with a high magnetic moment material.

16 Claims, 8 Drawing Sheets

ELECTRON BEAM LITHOGRAPHY METHOD FOR PLATING SUB-100 NM TRENCHES

CROSS REFERENCE TO RELATED APPLICATIONS

This application claims priority to U.S. Provisional Patent Application Ser. No. 60/317,699, filed Sep. 6, 2001.

FIELD OF THE INVENTION

This invention relates generally to lithography methods for printing and plating isolated narrow trenches with feature dimensions less than 100 nm, and more particularly, to a bi-layer lithographic method utilizing a thin undercoat dissolution layer beneath a resist layer.

BACKGROUND OF THE INVENTION

The areal density of magnetic disk storage has sustained annual increases of 100% during the last five years, largely due to shrinking dimensions in the read/write head. From a process perspective, this requires that the width of the critical read sensor and writer pole tip decrease by 20% to 30% each year. At 100 $Gbit/in^2$ density, assuming a 4 to 1 bit cell aspect ratio, a trackpitch should be approximately 160 nm. Considering approximately 20% for track misregistration ("TMR"), the trackwidth should be approximately 130 nm. Doubtlessly, with rapidly approaching high areal densities of 1 $Terabit/in^2$, the critical dimension ("CD") needs to be pushed down to 30 nm. Additionally, sufficient confinement of magnetic fields require the write pole tip to have an aspect ratio of between 7:1 to 10:1, which is achieved by electroplating high magnetic moment materials into a narrow trench printed in the resist. In the context of a narrow trench as described above, the aspect ratio is defined as the height divided by the width. The width is also referred to as the critical dimension, CD.

Accordingly, there is a need for a method for lithographic patterning of sub-100 nm isolated trench with a high aspect ratio and electroplating magnetic moment materials into the trench.

SUMMARY OF THE INVENTION

The invention provides a bi-layer lithography method for printing and plating sub-100 nm narrow trenches having a high aspect ratio. The method can include providing a thin layer of polymer as an undercoat dissolution layer disposed intermediate a substrate and a resist layer. The substrate can normally be coated with a non-magnetic seed layer prior to deposition of the undercoat layer. The resist and undercoat layer are exposed to a radiation source capable of sub-100 nm resolution, such as an electron beam, to pattern the narrow trench and an aqueous developer solution is then used to define the narrow trench. The exposed portions of the resist and undercoat dissolution layer are thereafter dissolved in a standard aqueous base developer solution to define the narrow trench. The narrow trench can then be electroplated with a high magnetic moment material to form, for example, a pole tip of a magnetic write head. Unlike the resist, the undercoat material can be more completely cleared off the seed layer by the developer solution. As a result, the sides of the narrow trench will be generally vertical, particularly at the base of the narrow trench, since relatively little of the undercoat material remains on the seed layer.

Additional steps can include one or more of the following: baking the undercoat layer after it has been deposited on the substrate/seed layer; baking the resist layer after it has been deposited on the undercoat layer; and baking both layers after e-beam exposure. The baking time and baking temperature can be calculated to control various properties of the process, particularly the dissolution rate of the undercoat layer.

Other details, objects, and advantages of the invention will become apparent from the following detailed description and the accompanying drawings of certain embodiments thereof.

BRIEF DESCRIPTION OF THE DRAWINGS

A more complete understanding of the invention can be obtained by considering the following detailed description in conjunction with the accompanying drawings, in which.

DETAILED DESCRIPTION

Figure 1:
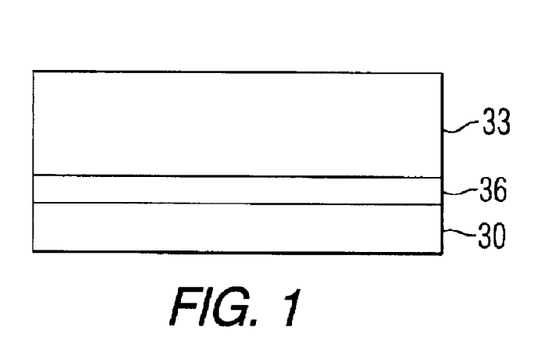
FIGS. 1–3 illustrate a conventional process for patterning a narrow trench.
Figure 2:
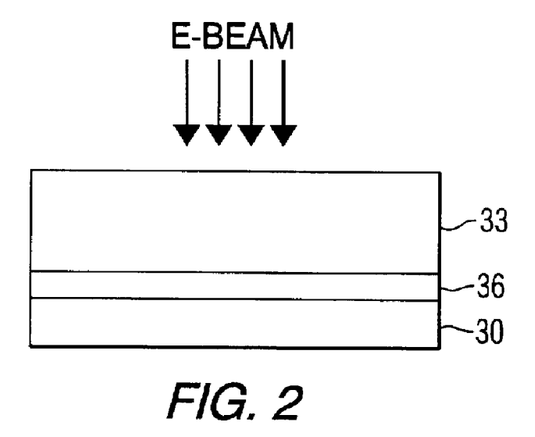
Figure 3:
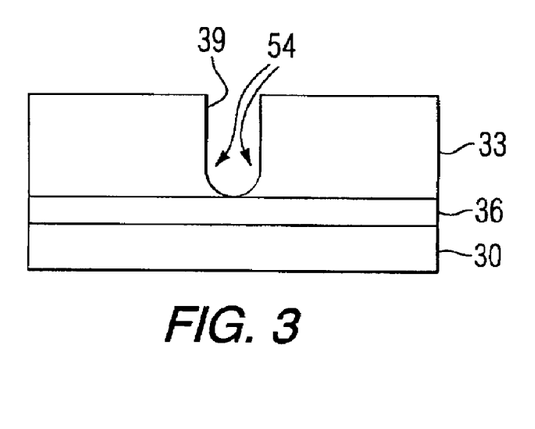

As areal density increases to higher than 100 $Gbit/in^2$, it is imperative to be able to both print narrow isolated trenches with feature dimensions less than 100 nm and a high aspect ratio, and then to plate the trenches with high magnetic moment materials. A principal application for this technology is the creation of write pole tips for magnetic heads. A conventional electron beam, or "e-beam," lithographic process for patterning a sub-100 nm trench is illustrated in FIGS. 1 through 3. In this type of method the pole tip is created by electro-deposition of high magnetic moment material into the narrow trench. As shown in FIG. 1, the conventional process consists of providing a substrate 30 on which a resist layer 33 is deposited. Normally however, the substrate 30 is first coated with a non-magnetic seed layer 36 prior to deposition of the resist layer 33. By way of example, the substrate 30 can be AlTiC, an alloy of aluminum, titanium, and carbon. The seed layer 36 can be nickel vanadium ("NiV"). Alternative seed layer materials can include nickel phosphorus, nickel molybdenum, nickel chromium, nickel tungsten, gold, and copper. The resist layer 33 can be, for example, a deep ultravoid ("DUV") resist layer, such as UV113, which can be obtained from industry suppliers such as Hoechst Celanese, Sumitomo, and Shipley. Next, as shown in FIG. 2, the DUV resist layer 33 is exposed to an electron beam to pattern a narrow trench. Basically, a "pattern" of the trench is created in the resist layer 33 by the electron beam. After e-beam exposure, the resist layer 33 is developed using an appropriate solution to define, or "print," the narrow trench 39, as shown in FIG. 3. Once the narrow trench 39 has been printed, it is ready to be plated, such as by electro-deposition, with a high magnetic moment material to form, for example, a pole tip. Preferably, the plating material is a high magnetic moment material, for example CoNiFe. After plating, the remaining resist layer 33 can be removed by an appropriate strip solution, for example NMP. If plating is successful, only a plated pole tip will remain.

Figure 4:
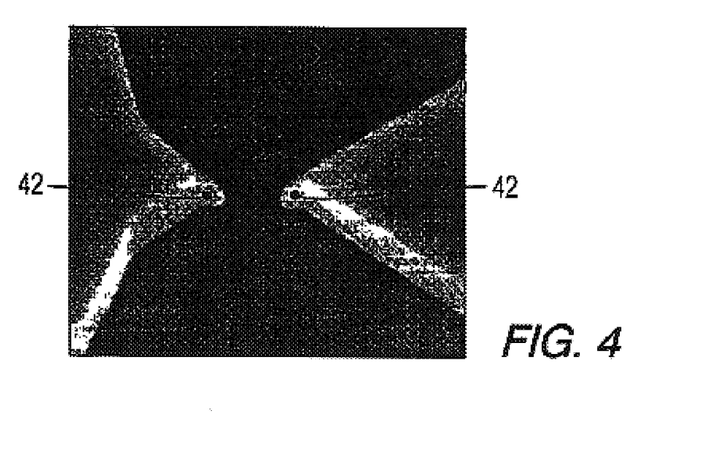
FIG. 4 is a pictorial representation of a scanning electron microscopy ("SEM") image of a 90 nm pole tip patterned using the conventional process shown in FIGS. 1–3.

Referring to FIG. 4, there is shown a sub-100 nm pole tip 42 is shown which was printed using a conventional electron beam lithography process such as described above. For example, to produce the pole tip 42, a narrow trench having a CD of about 90 nm was printed using a 0.65 µm thick DUV resist layer, giving an aspect ratio of approximately 7.3:1. However, the attempt to electroplate the narrow trench, for example with CoNiFe, failed, as indicated by the gap in the middle of the pole tip 42.

Figure 5:
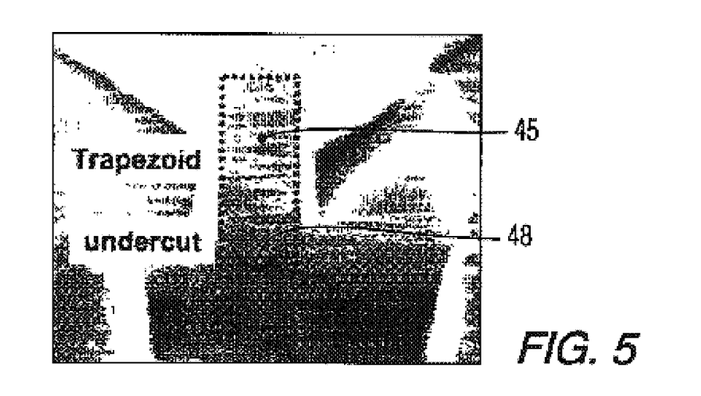
FIG. 5 is a pictorial representation of a focus ion beam ("FIB") cross sectional image of a 120 nm plated pole tip patterned using the conventional process shown in FIGS. 1–3.

FIG. 5 shows a printed and plated 120 nm pole tip 45, demarcated generally by a dotted rectangular outline, which reveals an undercut profile 48, i.e., rounded base, at the bottom of the pole tip 45. In this context, "undercut" refers to the side walls of the pole tip not being vertical at the bottom. This condition tends to indicate that the prior inability to successfully plate sub-100 nm narrow trenches by electro-deposition methods may result from such an undercut profile 48 created at the bottom of the plated pole tip 45. The undercut profile 48 may prevent the plating material from attaching to the seed layer, or substrate, at the bottom of the trench. A close examination of the bottom of the corresponding patterned resist 51, shown in FIG. 6, reveals a resist "foot" 54 at the bottom 57 of the trench 60. This tends to suggest that a main failure mechanism for plating the narrow isolated trench 60 can be a tendency for the resist 51 to not completely clear the bottom 57 of the trench 60, leaving residual material from the resist 51 stuck to the underlying seed layer 66. This residual material causes the foot 54 at the bottom 57 of the trench 60, which in turn results in the undercut profile 48 shown in FIG. 5, and the potentially consequent inability to successfully plate the sub-100 nm narrow trench 60.

Figure 6:
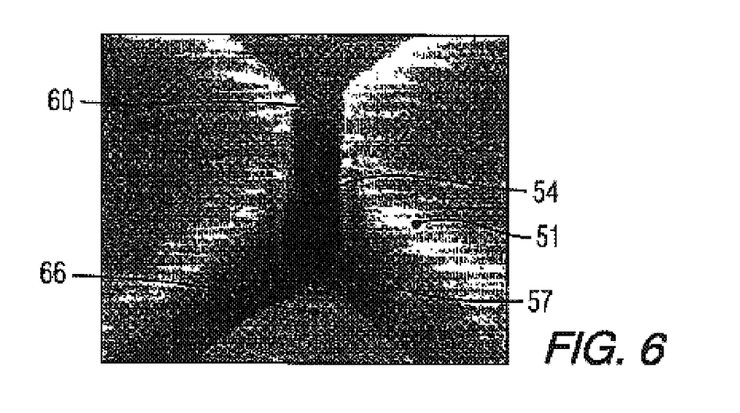
FIG. 6 is a pictorial representation of an SEM image of the 120 nm trench patterned using the conventional process shown in FIGS. 1–3 before it was plated to form the pole tip shown in FIG. 5.

The failure to completely clear the resist 51 from the bottom 57 of the narrow trench 60 during the developing process can potentially be due to a couple of reasons. The first such reason can be that the resist 51 simply tends to adhere to the seed layer 66, and is thus difficult to completely remove. The second reason, which may also be related to the first reason, can be that the narrowness of the trench 60 limits the ability of the aqueous base developing solution, or a sufficient amount thereof, to penetrate all the way to the bottom 57 of the trench 60 to sufficiently clear away all of the resist 51. The second reason regards the physics of diffusion of liquids into a very narrow trench. Generally, because the width of the trench 60 is so small, i.e., less than 100 nm, it can be difficult for a sufficient amount of fresh development solution liquid to diffuse into the trench 60 and thereby penetrate all the way to the bottom 57 of the trench 60 to completely remove all of the resist 51 from the seed layer 66.

Referring now to FIGS. 7 through 10, there is shown a certain embodiment of a bi-layer lithography method for printing and plating sub-100 nm narrow trenches having a high aspect ratio. The method can include employing a thin layer of polymer as an undercoat dissolution layer 70 disposed intermediate the substrate 73 and the resist layer 76. Preferably, however, the undercoat dissolution layer 70 will normally be disposed on a non-magnetic seed layer 79 with which the substrate 70 is normally first coated with prior to deposition of the undercoat dissolution layer 70. The undercoat dissolution layer 70 can be dissolvable in a standard aqueous base developer solution, such as tetramethyl ammonium hydroxide ("TMAH"). The undercoat dissolution layer 70 will preferably meet three criteria. First, the dissolution layer 70 should have a dissolution rate greater than the dissolution rate of the resist layer 76, i.e., the dissolution layer should be quickly and easily dissolved compared to the resist layer 76 during the developing process. Second, ideally, the dissolution rate of the material comprising the undercoat dissolution layer 70 will be temperature dependent. This will permit the dissolution rate of the undercoat layer 70 to be tunable by control of the bake temperature. Third, and lastly, use of the undercoat dissolution layer 70 must enable the printing and plating of a sub-100 nm narrow trench 82 wherein the bottom 85 of the trench 82 is completely clear of resist 76. This results in vertical trench side walls 88, particularly at the bottom 85 of the narrow trench 82, which facilitates successful plating of the narrow trench 82 with high magnetic moment materials. Moreover, such results should be achievable by control of certain processing conditions, such as, for example, bake temperature, the thickness of the undercoat dissolution layer 70, and the like. A preferred undercoat dissolution layer 70 is be polymethylglutarimide ("PMGI"), which can be purchased from MicroChem Corporation. PMGI is also commercially known as SAL-110 or LOL-1000 when purchased from the Shipley Company. The difference between SAL-110 and LOL-1000 is its molecular weight (Mw). The Mw of SAL-110 is 110,000 Daltons and the Mw of LOL-1000 is approximately 20,000 Daltons. Although PMGI is the best known material for use as the undercoat dissolution layer, other materials which have similar properties, e.g., a dissolution rate greater than the resist layer 76, temperature dependent dissolution rate, etc., such that sub-100 nm trenches can be successfully plated, could be substituted for use as the undercoat dissolution layer in light of the teachings of the invention as disclosed herein.

Figure 7:
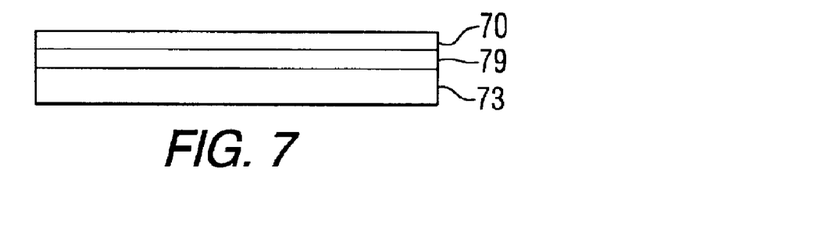
FIGS. 7–10 illustrate a certain embodiment of a method for patterning a sub-100 nm narrow trench.
Figure 8:
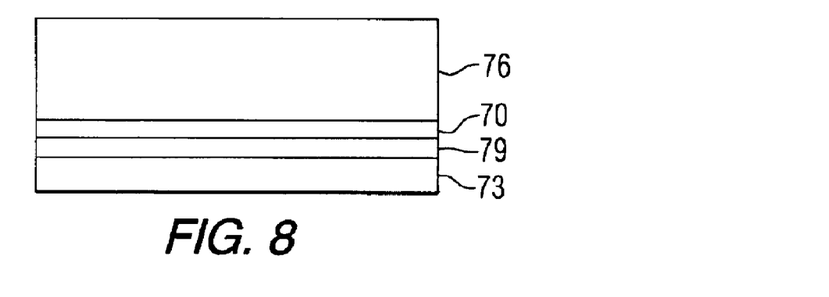
Figure 9:
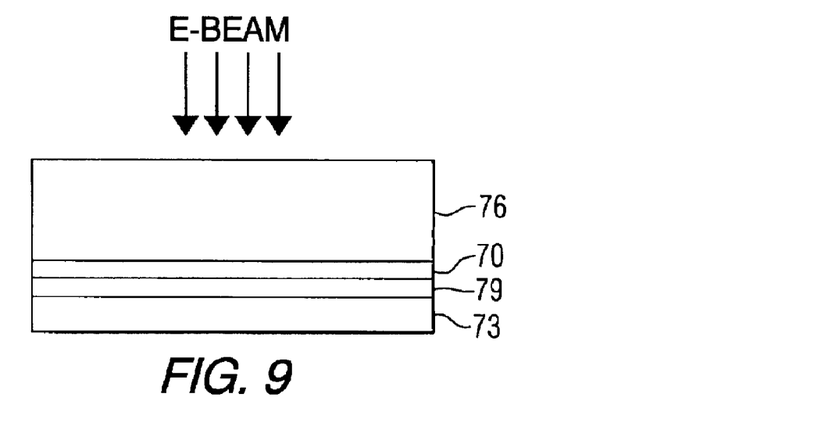
Figure 10:
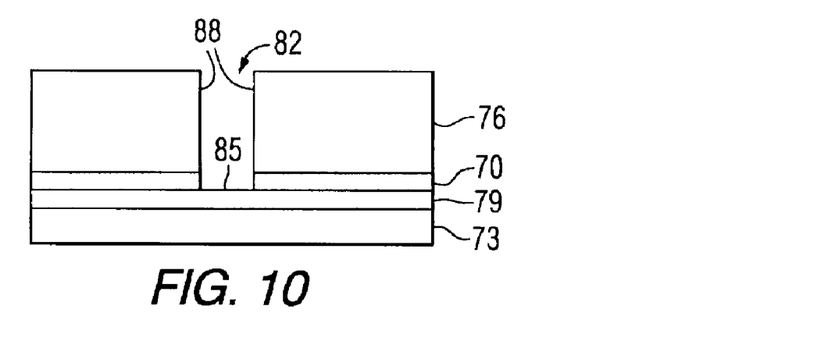

According to the embodiment illustrated, the method can generally comprise the following steps: (1) providing a thin PMGI undercoat dissolution layer 70 on a seed layer 79 (or simply on a substrate 73), as shown in FIG. 7; (2) providing a resist layer 76 on top of the PMGI layer 70, as shown in FIG. 8; (3) exposing the resist 76 and PMGI 70 layers to a radiation source capable of sub-100 nm resolution to pattern a narrow trench, as shown in FIG. 9; (4) developing the exposed resist 76 and PMGI 70 layers to print the narrow trench 82, as shown in FIG. 10, wherein the PMGI undercoat layer 70 is generally completely removed from the bottom 85 of the trench 82 by the development solution so that the side walls 88 of the trench 82 are generally vertical, especially at the bottom 85; and (5) plating the trench 82 with a high magnetic moment material to form a pole tip (not shown). The thickness of the thin PMGI layer 70 can be from about 10 nm to about 50 nm, and can also be related to the thickness of the resist layer 76. The thickness of the resist layer 76 is also variable, as is the width of the trench 82, since the combination of these dimensions define the aspect ratio of the trench 82. Electron beam lithography can be utilized in this embodiment, but it is to be understood that other radiation sources capable of sub-100 nm resolution could be utilized. Generally, radiation sources used for lithography can be classified into photon lithography (optical, UV, deep UV), electron beam lithography, and ion beam lithography. Resolution is limited by the wavelength of the radiation source. Consequently, lithography processes using very short wavelength radiation sources are preferred. Some of the preferred lithography processes for making sub-100 nm features include electron beam lithography, X-ray lithography, extreme ultraviolet (EUV) lithography, and ion-beam lithography.

Other embodiments of the invention can comprise one or more of the following additional steps. baking the PMGI layer 70 after it has been deposited; baking the resist layer 76 after it has been deposited on the PMGI layer 70; and baking the resist 76 and PMGI 70 layers after patterning the narrow trench 82. Because the PMGI dissolution rate is temperature dependent, using different temperatures provides control over the dissolution rate of PMGI. By controlling the bake temperature a desired dissolution rate can be obtained, which can vary depending on the thickness of the PMGI layer, in order to completely clear off the bottom of the narrow trench 82 to ensure generally vertical side walls 88. The resist layer 76 is initially baked immediately after being coated on the PMGI layer 70. This process is commonly referred to as "post apply bake" (PAB). The process used to deposit the resist layer 76 on the PMGI layer 70, which can involve spin-coating and air-drying, can result in the resist layer 76 containing up to 15% residual solvent. The PAB step is used to remove this residual solvent prior to electron beam exposure. The second baking process is performed after e-beam exposure, and is referred to as "post exposure bake" (PEB). PEB is normally performed immediately after e-beam exposure. After the resist layer has been exposed and the latent image generated, chemical reactions occur when the wafer is baked above a given chemical activation energy. In the case of a DUV resist layer such as, for example, UV113, PEB is used to induce new reactions that aid in developing subsequent relief images in the resist layer 76.

In a certain embodiment: PAB the PMGI layer 70 at 165° C. after deposition on the seed layer 79; PAB the DUV resist layer 76, which can be UV113, at 130° C. for 60 seconds after it is coated on the PMGI layer 70; expose the resist layer 76 is to 50 keV electron beam to pattern the narrow trench 82.; PEB the exposed resist layer 76 at 130° C.; use LDD-26W developing solution to define the narrow trench 82. LDD-26W is a basic salt TMAH with a surfactant included. Alternative developing solutions to TMAH can include potassium hydroxide ("KOH") and, a relatively weaker solution known as AZ developer (consisting of sodium hydroxide buffered with a phosphoric acid, trisodium salt and silicic acid). Moreover, those skilled in the art will understand that various types of developers, as well as variable strength formulations of the same (e.g., solution diluted by $H_2O$), could be substituted as the developer in light of the teachings of this application and the particular parameters of the process, including the thickness of the resist and undercoat layer, the width of the trench, and the like. Such developer solutions can be obtained from industry suppliers such as Hoechst Celanese, Sumitomo, and Shipley.

Figure 11:
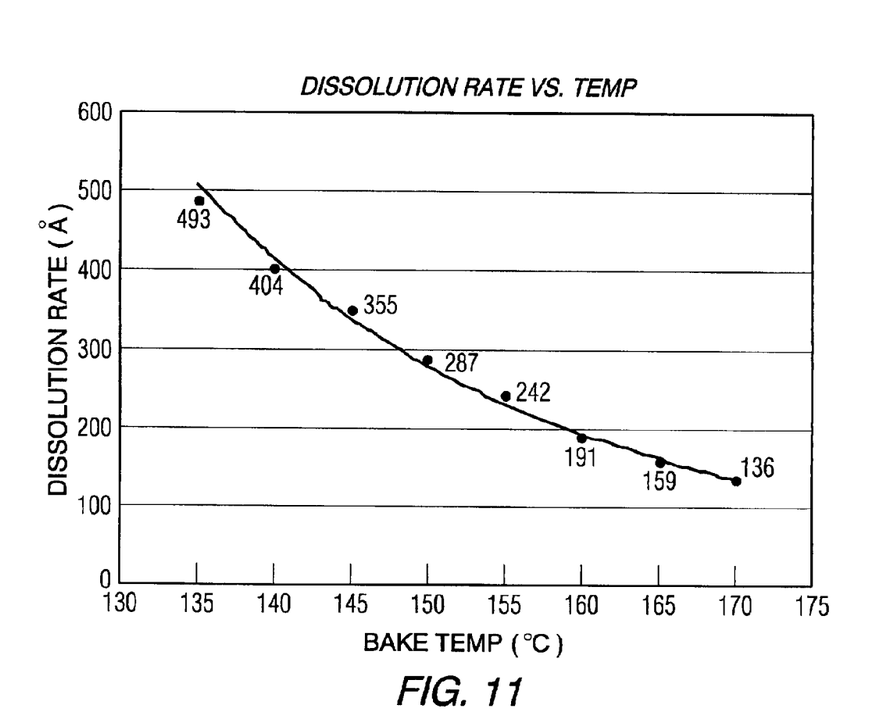
FIG. 11 is a graph of dissolution rate vs. bake temperature for PMGI.

The bake temperature, PEB or PAB, and the bake time can be manipulated to control various properties of the process. Referring to the graph in FIG. 11, the dissolution rate of PMGI has been found to vary as a function of the bake temperature. In particular, as the bake temperature is increased, the dissolution rate of PMGI decreases. Consequently, if the bake temperature is too high, an insufficient amount of the PMGI layer 70 can be dissolved, thus leaving the same type of foot at the base of the side walls 88 of the narrow trench 82 as described previously. On the other hand, if the bake temperature is too low, too much of the exposed PMGI layer 70 may be dissolved, thus creating an undercut below the side walls 88 of the trench 82. An undercut of the side walls 88 would result in an unwanted "foot" at the bottom of the plated pole tip. Such a foot on the pole tip, which is a high magnetic moment material, could effect device performance by adding additional magnetic fields. Consequently, the bake temperature should be carefully chosen to avoid generally any undercut of the resist layer 70.

Figure 12:
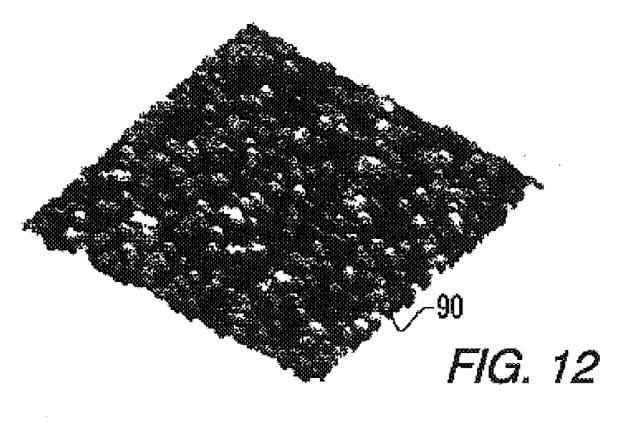
FIG. 12 is a pictorial representation of an atomic force microscopy ("AFM") image of the surface of a seed layer.
Figure 13:
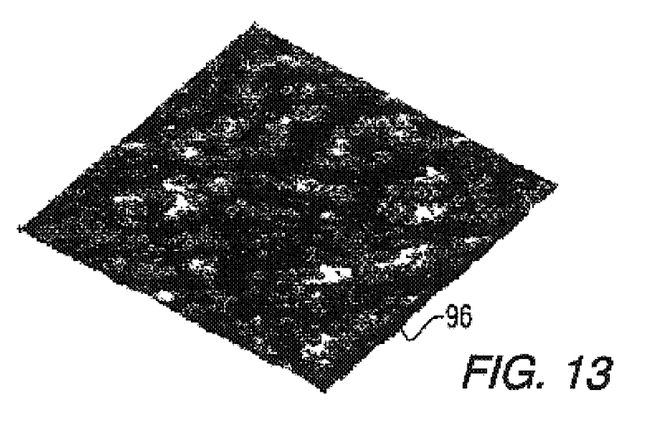
FIGS. 13–14 are pictorial representations of AFM images showing the seed layer in FIG. 12 after deposition, exposure, and development of a resist layer, with and without an undercoat dissolution layer, respectively.
Figure 14:
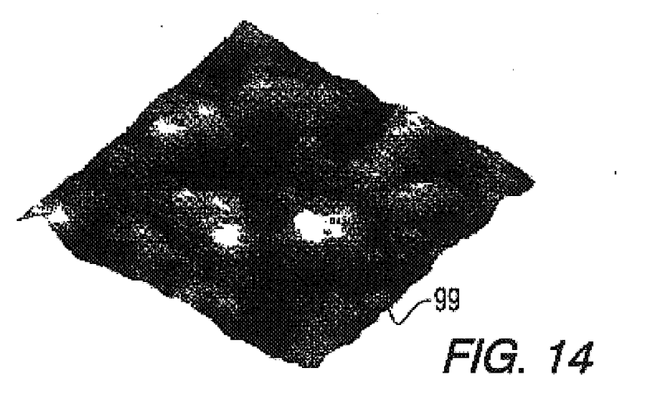

Referring to FIG. 12, there is shown the surface of a seed layer 90, for example NiV, on a substrate, which can be AlTiC. The surface of the seed layer 90 consists primarily of approximately 10 nm grains. Additional images of an area near a printed narrow trench (the trench itself is not shown in the figures) are provided in FIGS. 13 and 14. These images suggest that a method using a PMGI undercoat layer can clear resist residual at the bottom of a narrow trench. FIG. 13 shows the topography of an area of a seed layer 96 near the bottom of a narrow trench that was printed in accordance with a method according to the invention as described in FIGS. 7 through 10, i.e., wherein the seed layer 96 was coated with a PMGI undercoat layer, and a UV113 resist layer. The image reveals that the surface of the seed layer 96 is generally smooth and clear, with very similar structure, i.e., lots of approximately 10 nm grains, as that of the surface of the bare seed layer 90 shown in FIG. 12. In contrast, a totally different feature is observed on the surface of the seed layer 99 in FIG. 14. In this case, the trench was patterned and printed according to the conventional process described in FIGS. 1 through 3, i.e., the seed layer 99 was coated with a UV113 resist layer, but no PMGI undercoat layer. As can be seen in the image, the seed layer 99 has a rougher surface compared to either the bare seed layer 90 or the seed layer 96, which had a PMGI undercoat layer. Data from grain size analysis of the image in FIG. 14 indicates that many "bulk-like" clusters with dimensions of roughly 20 nm to 60 nm remain on the surface of the seed layer 99. Thus, the data suggests that in a process which does not utilize an undercoat dissolution layer, the resist does not completely clear the bottom of the narrow trench on the nanometer scale. As shown in FIG. 14, some resist residuals on the scale of tens of nanometers adhere to the surface of the seed layer 99. It can be very difficult, if not impossible, to completely clear every trace of the small resist residuals using the conventional develop process due to the extremely narrow width and high aspect ratio of the trenches being patterned and printed.

In view of the above, using a PMGI undercoat dissolution layer method according to the invention enables a significant advantage in electroplating narrow trenches to be realized.

Figure 15:
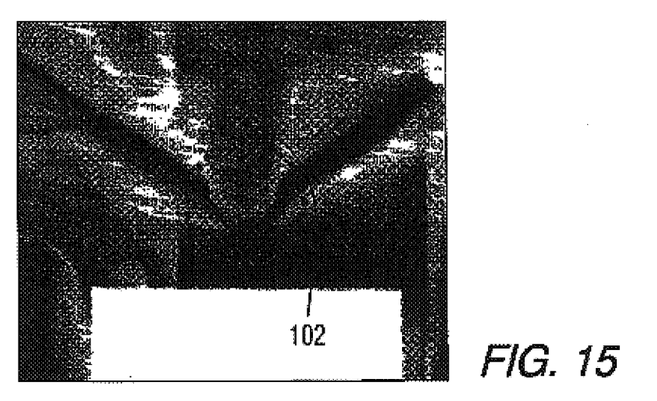
FIG. 15 is a pictorial representation of a FIB cross sectional image of a 90 nm pole tip patterned using the conventional process shown in FIGS. 1–3.
Figure 16:
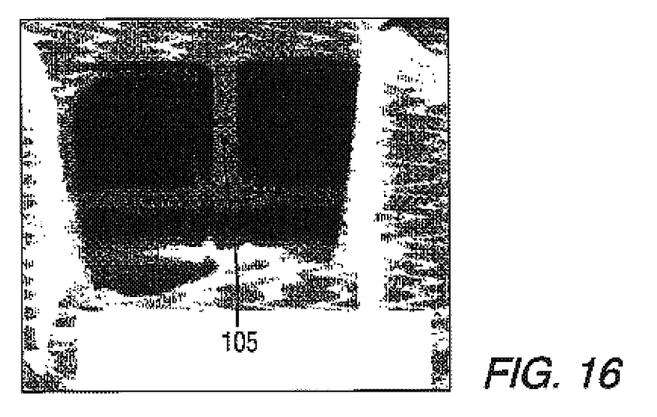
FIGS. 16–17 are pictorial representations of FIB cross sectional images of a 90 nm pole tip patterned using the process illustrated in FIGS. 7–10.
Figure 17:
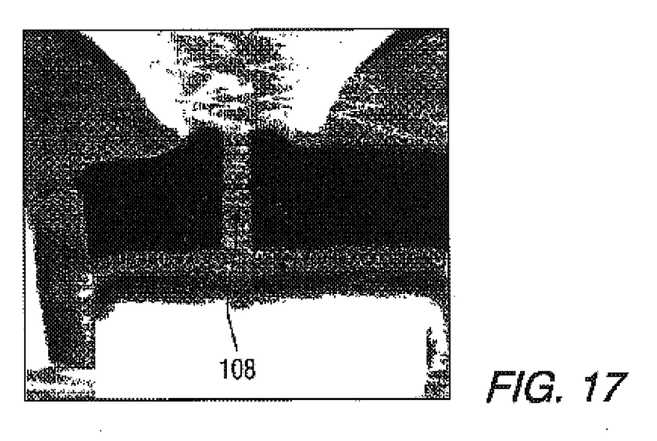

This is demonstrated by FIGS. 15 through 17, which providing a direct comparison of the PMGI undercoat layer effect on plated 90 nm top poles. FIG. 15 shows a 90 nm top pole 102 which was printed and plated, unsuccessfully (see FIG. 18), without using a PMGI undercoat layer process. In contrast, FIGS. 16 and 17 show 90 nm top poles 105, 108, respectively, which were printed and successfully plated using a PMGI undercoat layer process. The top pole 105 in FIG. 16 was plated with NiFe whereas the top pole 108 in FIG. 17 was plated with CoNiFe.

Figure 18:
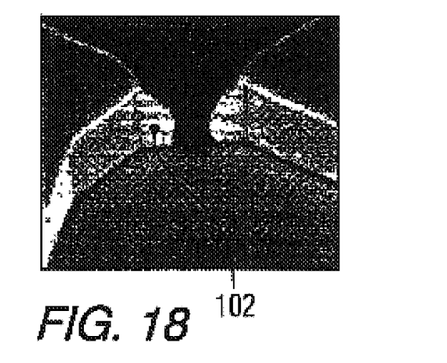
FIG. 18 is a pictorial representation of an FIB image of the plated pole tip shown in FIG. 15.
Figure 19:
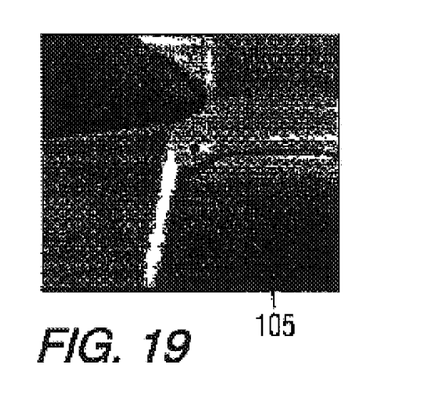
FIGS. 19–20 are pictorial representations of FIB images of the plated pole tips shown in FIGS. 16–17.
Figure 20:
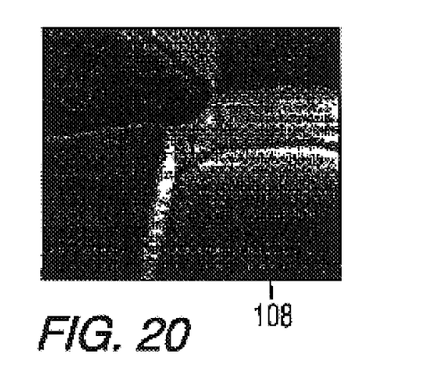

This comparison can be better appreciated from FIGS. 18 through 20, which show the side walls of the plated pole tips in FIGS. 15 through 17, respectively. These FIGS. more clearly illustrate the benefits of the PMGI undercoat layer process. As can be easily observed from FIG. 18, the pole tip 102 printed without using a PMGI undercoat layer process could not be successfully plated, in this case with CoNiFe, as indicated by the break in the middle of the pole tip 102. In contrast, the pole tips 105 and 108 in FIGS. 19 and 20 were successfully plated with NiFe and CoNiFe, respectively. The PMGI undercoat layer process also results in generally smooth side walls on both the NiFe plated pole tip 105 and the CoNiFe plated pole tip 108.

Figure 21:
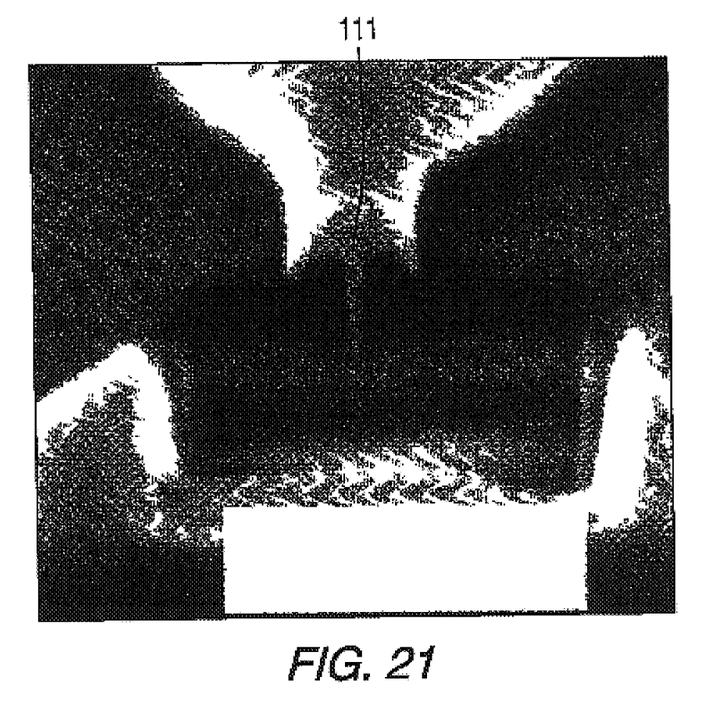
FIGS. 21–22 are pictorial representations of FIB cross sectional images of very narrow pole tips successfully printed and plated using the process illustrated in FIGS. 7–10.
Figure 22:
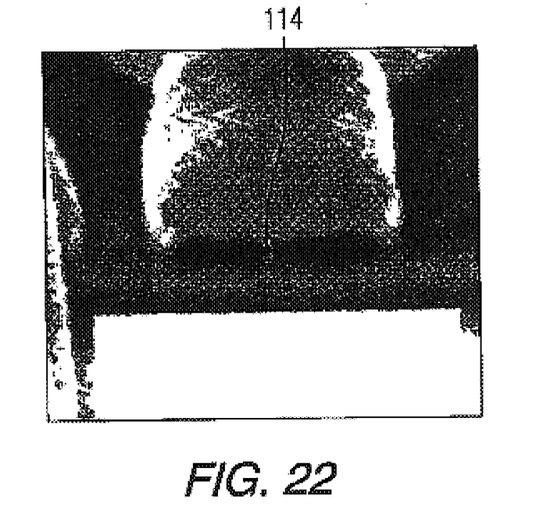

FIGS. 21 and 22 further demonstrate the success of utilizing a PMGI undercoat dissolution layer. The use of the PMGI undercoat layer enables printing and plating narrow trenches having a critical dimension far less than 100 nm. FIG. 21, for example, shows a pole tip 111 having a CD of 30 nm and an aspect ratio of 8.3:1. FIG. 22 shows an even smaller pole tip 114, having a CD of 22 nm and an aspect ratio of 4.5:1. In these examples, both pole tips 111, 114 were successfully plated with NiFe. Alternative high magnetic moment materials could also be utilized in addition to NiFe. The 22 nm pole tip 114 is believed to be the narrowest electro-deposited pole tip ever fabricated.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A method for plating a sub-100 nm narrow trench, said method comprising:
   disposing a dissolution layer on a substrate, said dissolution layer having a first dissolution rate and a thickness of from about 10 nm to about 50 nm;
   disposing a resist layer on said dissolution layer, said resist layer having a second dissolution rate which is less than said first dissolution rate;
   patterning said narrow trench by exposing said resist layer to a radiation source capable of sub-100 nm resolution;
   developing said narrow trench with a developer solution wherein said dissolution layer is substantially completely cleared from said substrate resulting in substantially vertical sidewalls of said sub-100 nm narrow trench; and
   depositing a high magnetic moment material into said narrow trench.

2. The method of claim 1 further comprising:
   disposing a seed layer on said substrate; and
   disposing said undercoat dissolution layer on said seed layer.

3. The method of claim 1 wherein said radiation source comprises one of an electron beam, an X-ray, extreme ultraviolet, and an ion-beam.

4. The method of claim 1 further comprising baking said undercoat dissolution layer subsequent to disposing on said substrate.

5. The method of claim 1 further comprising baking said resist layer subsequent to disposing on said undercoat dissolution layer.

6. The method of claim 1 further comprising baking said undercoat dissolution layer and said resist layer subsequent to patterning said narrow trench.

7. The method of claim 1 further comprising:
   baking said undercoat dissolution layer subsequent to coating said substrate or seed layer and prior to deposition of said resist layer;
   baking said resist layer subsequent to deposition on said undercoat dissolution layer; and
   baking said undercoat dissolution layer and said resist layer subsequent to patterning said narrow trench.

8. The method of claim 7 wherein said undercoat dissolution layer is PMGI and further comprising:
   hard bake said PMGI layer at 165° C. after coating on said substrate or seed layer;
   PAB said resist layer after deposition on said PMGI layer at 130° C.; and
   PEB said PMGI layer and said resist layer at 130° C. subsequent to patterning said narrow trench.

9. The method of claim 8 wherein said resist layer is a DUV resist layer and said patterning further comprises exposing said DUV resist layer to an electron beam at 50 keV.

10. The method of claim 1 wherein said first dissolution rate is variable in relation to bake temperature.

11. A multilayer structure adapted for defining a sub-100 nm narrow trench by exposing the multilayer structure to a radiation source capable of sub-100 nm resolution and subsequently clearing said narrow trench using a developer solution, said multilayer structure comprising:
   a substrate;
   a dissolution layer disposed on said substrate, said dissolution layer having a first dissolution rate and a thickness of from about 10 nm to about 50 nm;
   a resist layer disposed on said dissolution layer, said resist layer having a second dissolution rate which is less than said first dissolution rate;
   said resist layer and undercoat dissolution layer adapted for removal from said substrate to define said narrow trench via exposure to said radiation source and subsequent dissolution by said developer solution; and
   wherein said dissolution layer is substantially completely cleared from said substrate resulting in substantially vertical sidewalls of said sub-100 nm narrow trench.

12. The structure of claim 11 further comprising a seed layer disposed between said substrate and said undercoat dissolution layer.

13. The structure of claim 11 wherein said radiation source comprises one of an electron beam, an X-ray, extreme ultraviolet, and an ion-beam.

14. The structure of claim 11 wherein said first dissolution rate is variable in relation to temperature.

15. The structure of claim 11 wherein said undercoat dissolution layer is PMGI.

16. The structure of claim 15 wherein said resist layer is a DUV resist layer.

* * * * *